United States Patent
Fang et al.

(10) Patent No.: US 11,341,297 B2
(45) Date of Patent: May 24, 2022

(54) OBSTACLE DISTRIBUTION SIMULATION METHOD, DEVICE AND TERMINAL BASED ON A PROBABILITY GRAPH

(71) Applicant: Baidu Online Network Technology (Beijing) Co., Ltd., Beijing (CN)

(72) Inventors: Jin Fang, Beijing (CN); Feilong Yan, Beijing (CN); Ruigang Yang, Beijing (CN); Liang Wang, Beijing (CN); Yu Ma, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 321 days.

(21) Appl. No.: 16/514,824

(22) Filed: Jul. 17, 2019

(65) Prior Publication Data
US 2020/0082039 A1    Mar. 12, 2020

(30) Foreign Application Priority Data

Sep. 7, 2018    (CN) .......................... 201811044644.5

(51) Int. Cl.
*G06F 30/20*     (2020.01)
*G06V 10/75*     (2022.01)
(Continued)

(52) U.S. Cl.
CPC ............ *G06F 30/20* (2020.01); *G06V 10/751* (2022.01); *G06V 20/58* (2022.01); *G06F 2111/10* (2020.01)

(58) Field of Classification Search
CPC ...... G06F 30/20; G06F 2111/10; G06F 30/28; G06F 30/25; G06F 30/27; G06F 2111/00;
(Continued)

(56) References Cited

U.S. PATENT DOCUMENTS

| 2018/0157920 A1 | 6/2018 | Hu | |
| 2019/0228571 A1* | 7/2019 | Atsmon | ................ G06T 19/006 |
| 2019/0340775 A1* | 11/2019 | Lee | ...................... G05D 1/0212 |

FOREIGN PATENT DOCUMENTS

| CN | 106707293 A | 5/2017 |
| CN | 106845416 A | 6/2017 |

(Continued)

OTHER PUBLICATIONS

Bichen Wu, et al. "SqueezeSeg: Convolutional Neural Nets with Recurrent CRF for Real-Time Road-Object Segmentation from 3D LIDAR Point Cloud," 2018 IEEE International Conference on Robotics and Automation (ICRA), May 21-25, 2018 (Year: 2018).*

(Continued)

*Primary Examiner* — Steven W Crabb
(74) *Attorney, Agent, or Firm* — Knobbe, Martens, Olson & Bear, LLP

(57) ABSTRACT

Embodiments of an obstacle distribution simulation method, device and terminal based on a probability graph are provided. The method can include: acquiring a plurality of point clouds of a plurality of frames; acquiring real labeling data of an acquisition vehicle at vehicle labeled positions, and acquiring data of a simulation position of the acquisition vehicle; determining the number of obstacles to be simulated at a position to be simulated; extracting real labeling data of the obstacles, and constructing a labeling data set; dividing the labeling data set into a plurality of grids and calculating occurrence probabilities of the plurality of obstacles; selecting the determined number of obstacles to be simulated according to the occurrence probabilities; and acquiring a position distribution of the selected obstacles to be simulated for the position to be simulated based on the real labeling data of the selected obstacles to be simulated.

11 Claims, 4 Drawing Sheets

(51) Int. Cl.
*G06V 20/58* (2022.01)
*G06F 111/10* (2020.01)

(58) Field of Classification Search
CPC ............ G06F 2119/22; G06K 9/00805; G06K 9/6202; G06K 2009/487; G06K 9/6259; G06K 9/00214; G06T 7/277; G06T 17/20; G06T 2207/10028
See application file for complete search history.

(56) References Cited

FOREIGN PATENT DOCUMENTS

| | | |
|---|---|---|
| CN | 106919908 A | 7/2017 |
| CN | 106934347 A | 7/2017 |
| CN | 107392875 A | 11/2017 |
| CN | 108445882 A | 8/2018 |
| CN | 108470174 A | 8/2018 |

OTHER PUBLICATIONS

Chinese Office Action dated Jun. 4, 2019 for Application No. 201811044644.5, 8 pages.
Zhang, et al., "Structure-Constrained Obstacle Recognition for Transmission Line Inspection Robot," Key Laboratory of Complex Systems and Intelligence Science, Institute of Automation, Chinese Academy of Sciences, dated Jan. 31, 2007, 6 pages.
Lei, et al., "Study on obstacle detection based on laser range finder," College of Automation, Harbin Engineering University, pp. 718-723, dated Apr. 26, 2012.
Burgard et al., "Estimating the Absolute Position of a Mobile Robot Using Position Probability Grids Centibots View project Flourish View project Estimating the Absolute Position of a Mobile Robot Using Probability Grids" ResearchGate, Feb. 1996 in 16 pages.
European Extended Search Report, Application No. 19185798.6, dated Mar. 6, 2020 in 10 pages.
Gan et al., "3D Path Planning for a Rotary Wing UAV using a Gaussian Process Occupancy Map", Australasian Conference on Robotics and Automation (ACRA), Dec. 2009 in 6 pages.
Kapoor et al., "Active Learning with Gaussian Processes for Object Categorization", IEEE 11th International Conference on Computer Vision, Oct. 2007 in 8 pages.
Yue et al., "A LiDAR Point Cloud Generator: from a Virtual World to Autonomous Driving", Arxiv.org, Cornell University Library, Mar. 2018 in 7 pages.
Zhu et al., "Learning from Labeled and Unlabeled Data with Label Propagation", http://citeseerx.ist.psu.edu/viewdoc/download?doi=10.1.1.14.3864&rep=rep1&type=pdf, Jan. 2002 in 8 pages.
Search Report dated Dec. 9, 2019 for Chinese Application No. 2018110446445, 4 pages.

* cited by examiner

# OBSTACLE DISTRIBUTION SIMULATION METHOD, DEVICE AND TERMINAL BASED ON A PROBABILITY GRAPH

CROSS-REFERENCE TO RELATED APPLICATION

This application claims priority to Chinese Patent Application No. 201811044644.5, entitled "Obstacle Distribution Simulation Method, Device and Terminal Based on a Probability Graph", and filed on Sep. 7, 2018, which is hereby incorporated by reference in its entirety.

TECHNICAL FIELD

The present disclosure relates to the technical field of computers, and in particular to an obstacle distribution simulation method, device and terminal based on a probability graph.

BACKGROUND

In an off-line state of a high-precision map, labeling data of obstacles in the map may be collected. The labeling data includes a current position, an orientation, an ID and a type and the like of an obstacle. The type of the obstacle may be a dynamic obstacle such as a vehicle, a pedestrian and a rider, or a static obstacle such as a traffic cone. How to simulate the number and the position distribution of the obstacles so as to reconstruct the real conditions as much as possible is drawing more and more attention from those skilled in the art.

In the existing technical solutions, a high-precision map is generally used, and simulation is typically performed by using obstacle arrangement based on a rule Examples of the obstacle arrangement based on a rule include: vehicle arrangement in a direction of a lane line, and random pedestrian arrangement. However, very limited scenarios can be presented in the obstacle arrangement based on a rule. Since the high-precision map includes only main roads and includes no side roads or branch roads, a simulation result of the position distribution of the same type of obstacles and a simulation result of the number distribution of different types of obstacles differ from real conditions greatly. In addition, the obstacle arrangement based on a rule cannot present all the possible cases in a real scenario in an exhaustive manner, resulting in a low coverage.

SUMMARY

An obstacle distribution simulation method, device and terminal based on a probability graph are provided according to embodiments of the present disclosure, to solve at least the above technical problems in the existing technologies.

In a first aspect, an embodiment of the present disclosure provides an obstacle distribution simulation method based on probability map, which includes:

acquiring a plurality of point clouds of a plurality of frames, wherein each point cloud comprises a plurality of obstacles;

acquiring real labeling data of an acquisition vehicle at vehicle labeled positions, and acquiring data of a simulation position of the acquisition vehicle based on the real labeling data and a movement rule of the acquisition vehicle;

determining the number of obstacles to be simulated at a position to be simulated based on the data of simulation position of the acquisition vehicle;

extracting real labeling data of the obstacles in the plurality of point clouds, and constructing a labeling data set with the extracted real labeling data;

dividing the labeling data set into a plurality of grids and calculating occurrence probabilities of the plurality of obstacles in the plurality of grids;

selecting the determined number of obstacles to be simulated according to the occurrence probabilities; and acquiring a position distribution of the selected obstacles to be simulated for the position to be simulated based on the real labeling data of the selected obstacles to be simulated.

In combination with the first aspect, in a first implementation of the first aspect of the present disclosure, the calculating occurrence probabilities of the plurality of obstacles in the plurality of grids includes:

selecting one obstacle from the labeling data set, and acquiring real labeling data of the one obstacle;

matching a center of a Gaussian template to a position of the one obstacle in the real labeling data, and assigning weights of the Gaussian template to respective grids around the center;

traversing the real labeling data of the plurality of obstacles with the Gaussian template, and accumulating weights of each grid to obtain a total weight of the grid; and calculating the occurrence probabilities of the plurality of obstacles in the grids based on the total weights of the grids.

In combination with the first aspect, in a second implementation of the first aspect of the present disclosure, the selecting the determined number of obstacles to be simulated according to the occurrence probabilities includes:

selecting the determined number of obstacles to be simulated with an unequal probability sampling method according to the occurrence probabilities.

In combination with the first aspect, in a third implementation of the first aspect of the present disclosure, the determining the number of obstacles to be simulated at a position to be simulated based on the data of simulation position of the acquisition vehicle includes:

searching for real labeling data of the acquisition vehicle at the vehicle labeled position identical or adjacent to the position to be simulated; and retrieving a point cloud acquired at the vehicle labeled position, and determining the number of the obstacles in the retrieved point cloud as the number of obstacles to be simulated.

In a second aspect, an obstacle distribution simulation device based on a probability graph is provided according to an embodiment of the present disclosure, which includes:

a point cloud acquiring module, configured to acquire a plurality of point clouds of a plurality of frames, wherein each point cloud comprises a plurality of obstacles;

an acquisition vehicle simulating module, configured to acquire real labeling data of an acquisition vehicle at vehicle labeled positions, and acquire data of a simulation position of the acquisition vehicle based on the real labeling data and a movement rule of the acquisition vehicle;

a number determining module, configured to determine the number of obstacles to be simulated at a position to be simulated based on the data of simulation position of the acquisition vehicle;

an data set constructing module, configured to extract real labeling data of the obstacles in the plurality of point clouds, and construct a labeling data set with the extracted real labeling datas;

a probability calculating module, configured to divide the labeling data set into a plurality of grids and calculate occurrence probabilities of the plurality of obstacles in the plurality of grids;

an obstacle selecting module, configured to select the determined number of obstacles to be simulated according to the occurrence probabilities; and a position distribution acquiring module, configured to acquire a position distribution of the selected obstacles to be simulated for the position to be simulated based on the real labeling data of the selected obstacles to be simulated.

In combination with the second aspect, in a second implementation of the second aspect of the present disclosure, the probability calculating module includes:

a data selecting unit, configured to select one obstacle from the labeling data set, and acquire real labeling data of the one obstacle;

a weight assigning unit, configured to match a center of a Gaussian template to a position of the one obstacle in the real labeling data, and assign weights of the Gaussian template to respective grids around the center;

a traversing unit, configured to traverse the real labeling data of the plurality of obstacles with the Gaussian template, and accumulate weights of each grid to obtain a total weight of the grid; and a probability calculating unit, configured to calculate the occurrence probabilities of the plurality of obstacles in the grids based on the total weights of the grids.

In combination with the second aspect, in a third implementation of the second aspect of the present disclosure, the number determining module includes:

a data searching unit, configured to search for real labeling data of the acquisition vehicle at the vehicle labeled position identical or adjacent to the position to be simulated; and a number determining unit, configured to retrieve a point cloud acquired at the vehicle labeled position, and determine the number of the obstacles in the retrieved point cloud as the number of obstacles to be simulated.

In a third aspect, an obstacle distribution simulation terminal based on a probability graph is provided according to an embodiment of the present disclosure, which includes: a processor and a memory for storing a program which supports the obstacle distribution simulation device based on a probability graph in executing the obstacle distribution simulation method based on a probability graph described above in the first aspect, and the processor is configured to execute the program stored in the memory. The terminal can further include a communication interface for enabling the terminal to communicate with other devices or communication networks.

The functions may be implemented by using hardware or by executing corresponding software by hardware. The hardware or software includes one or more modules corresponding to the functions described above.

In a fourth aspect, an embodiment of the present disclosure provides a computer readable storage medium for storing computer software instructions used for an obstacle distribution simulation device based on a probability graph, the computer readable storage medium including a program involved in executing the obstacle distribution simulation method based on a probability graph described above in the first aspect by the obstacle distribution simulation device based on a probability graph.

One of the above technical solutions has the following advantages or advantageous effects: the labeling data set formed by real labeling data of the obstacles is divided into grids, and an occurrence probability of an obstacle in each grid is calculated; the determined number of obstacles to be simulated are selected according to the occurrence probabilities of the obstacles; and position distribution of the simulation obstacles is obtained according to the real labeling data of the simulation obstacles. The selected obstacles are not limited to real obstacles, thus increasing the generality and diversity of the positions of the obstacles.

The above summary is provided only for illustration, and is not intended to limit the present disclosure in any way. In addition to the illustrative aspects, embodiments and features described above, further aspects, embodiments and features of the present disclosure may be readily understood from the following detailed description with reference to the accompanying drawings

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION OF THE EMBODIMENT(S)

Hereinafter, only some example embodiments are described. As can be appreciated by those skilled in the art, the described embodiments may be modified in various different ways without departing from the spirit or scope of the present disclosure. Accordingly, the drawings and the description should be considered as illustrative in nature instead of being restrictive.

First Embodiment

Figure 1:
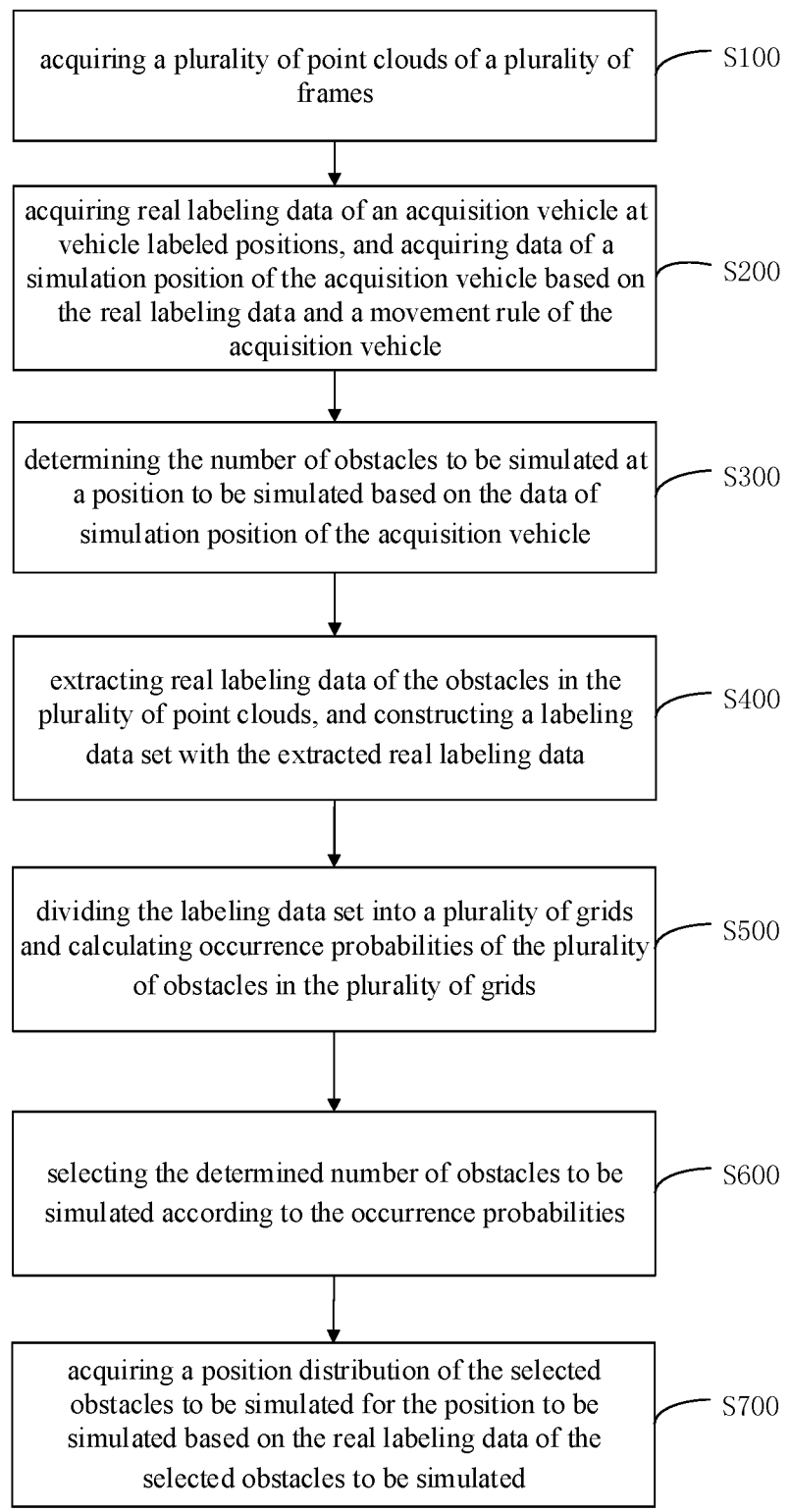
FIG. 1 is a flowchart of an obstacle distribution simulation method based on a probability graph according to an embodiment of the present disclosure.

In a specific embodiment, as shown in FIG. 1, an obstacle distribution simulation method based on a probability graph is provided, which includes:

Step S100: acquiring a plurality of point clouds of a plurality of frames, wherein each point cloud comprises a plurality of obstacles.

Figure 2:
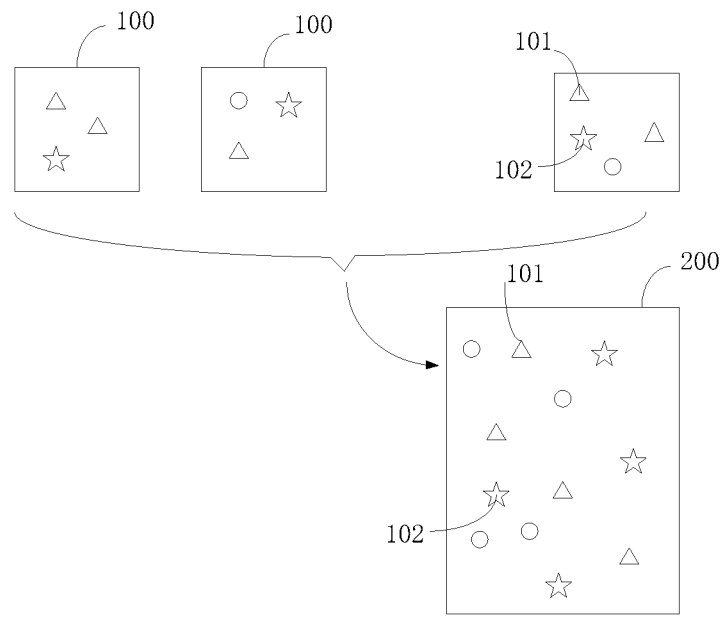
FIG. 2 is a schematic diagram of a labeling data set according to an embodiment of the present disclosure.

As shown in FIG. 2, when an acquisition vehicle moves along a movement route, the acquisition vehicle may obtain a point cloud 100 by scanning surrounding obstacles with a radar. For example, the obstacle may be a building 101, roadblock 102 and the like. The point cloud 100 may also be obtained directly externally.

Sept S200: acquiring real labeling data of an acquisition vehicle at vehicle labeled positions, and acquiring data of a simulation position of the acquisition vehicle based on the real labeling data and a movement rule of the acquisition vehicle.

The acquisition vehicle may have a movement rule of moving along a main road or moving along a specified side road, and various movement rule of the acquisition vehicle will fall within the protection scope of the embodiments of the present disclosure. A plurality of absolute coordinates of the acquisition vehicle along the movement route may serve as the data of the simulation position. Moreover, an interpolation operation may be performed to two adjacent absolute coordinates of the acquisition vehicle, that is, coordinates on a line connecting the two adjacent absolute coordinates of the acquisition vehicle serve as the data of the simulation position. In this way, the number of the absolute coordinates of the acquisition vehicle (i.e., positions where the acquisition vehicle may reach) is increased, such that a simulation position of the acquisition vehicle tends to be closer to a real position of the acquisition vehicle.

Step S300: determining the number of obstacles to be simulated at a position to be simulated based on the data of simulation position of the acquisition vehicle.

Real labeling data of the acquisition vehicle at the vehicle labeled position identical or adjacent to the position to be simulated is searched, a point cloud acquired at the vehicle labeled position is retrieved, and the number of the obstacles in the retrieved point cloud is determined as the number of obstacles to be simulated.

Step S400: extracting real labeling data of the obstacles in the plurality of point clouds, and constructing a labeling data set with the extracted real labeling data.

Step S500: dividing the labeling data set into a plurality of grids and calculating occurrence probabilities of the plurality of obstacles in the plurality of grids.

Figure 3:
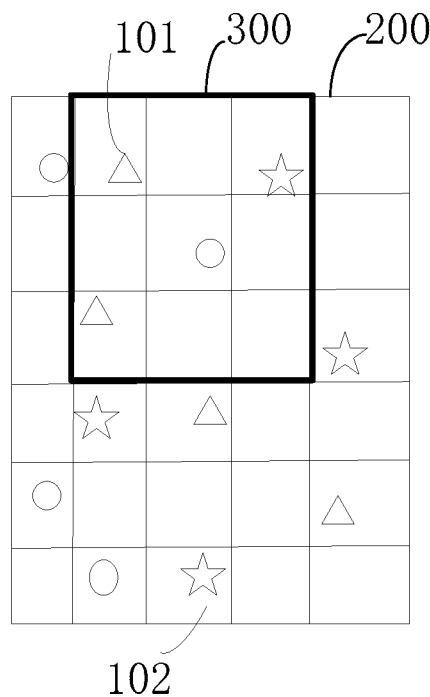
FIG. 3 is a schematic diagram of dividing a labeling data set into grids with a Gaussian template according to an embodiment of the present disclosure.

As shown in FIG. 3, the labeling data set 200 is divided into grids. The properties of a grid are mainly a shape and a size of the grid. The size of the grid is basically defined based on a related line segment and can be defined by the number of related line segments or the length of a related line segment. There may be one obstacle in the grid, or there may be multiple obstacles, or even no obstacle in the grid. A Gaussian template is used to assign a weight to each grid to further calculate the occurrence probabilities of the obstacles in each grid.

Step S600: selecting the determined number of obstacles to be simulated according to the occurrence probabilities.

Step S700: acquiring a position distribution of the selected obstacles to be simulated for the position to be simulated based on the real labeling data of the selected obstacles to be simulated.

The real labeling data of the obstacles to be simulated is acquired, and a position distribution based on the obstacles to be simulated is further obtained. Diversity of position simulation of obstacles is improved, and the simulation result of the number of obstacles and the simulation result of the position distribution are closer to real conditions.

In an embodiment, the calculating occurrence probabilities of the plurality of obstacles in the plurality of grids includes:

selecting one obstacle from the labeling data set, and acquiring real labeling data of the one obstacle;

matching a center of a Gaussian template to a position of the one obstacle in the real labeling data, and assigning weights of the Gaussian template to respective grids around the center;

traversing the real labeling data of the plurality of obstacles with the Gaussian template, and accumulating weights of each grid to obtain a total weight of the grid; and calculating the occurrence probabilities of the plurality of obstacles in the grids based on the total weights of the grids.

As shown in FIG. 3, the Gaussian template 300 is a matrix, and the number of rows and that of columns of the matrix can be selected as required. The center of the matrix has the highest weight, and weights of remaining portions are reduced with the distance from the center. Since the occurrence probability of the selected obstacle is 1, the center of the Gaussian template 300 is matched to the real labeling data of the selected obstacle. The respective remaining portions of the Gaussian template 300 correspond to respective grids other than the center, and weights are assigned to the grids. The center of the Gaussian template 300 is sequentially matched to each obstacle labeled with real labeling data. At each time of matching, the grids corresponding to the Gaussian template 300 are assigned to a weight respectively once. Finally, the weights are accumulated, and each grid corresponds to a total weight thereof. The occurrence probabilities of obstacles in each grid are calculated based on the total weight of said each grid.

In an embodiment, the selecting the determined number of obstacles to be simulated according to the occurrence probabilities includes:

selecting the determined number of obstacles to be simulated with an unequal probability sampling method according to the occurrence probabilities.

It should be noted that the selecting may be performed by other methods, including but not limited to the unequal probability sampling method, which all fall within the protection scope of the present embodiment.

In an embodiment, the obtaining the determining the number of obstacles to be simulated at a position to be simulated based on the data of simulation position of the acquisition vehicle includes:

searching for real labeling data of the acquisition vehicle at the vehicle labeled position identical or adjacent to the position to be simulated; and retrieving a point cloud acquired at the vehicle labeled position, and determining the number of the obstacles in the retrieved point cloud as the number of obstacles to be simulated.

Firstly, in the real labeling data set acquired by the acquisition vehicle along the movement route, real labeling data of the acquisition vehicle at the vehicle labeled position identical or adjacent to the position to be simulated is searched for. If no identical data is found, real labeling data closest to the data of the simulation position of the acquisition vehicle is searched for. A point cloud 100 acquired at the vehicle labeled position is retrieved, and the number of the obstacles in the retrieved point cloud 100 is determined as the number of the obstacles to be simulated.

Second Embodiment

Figure 4:
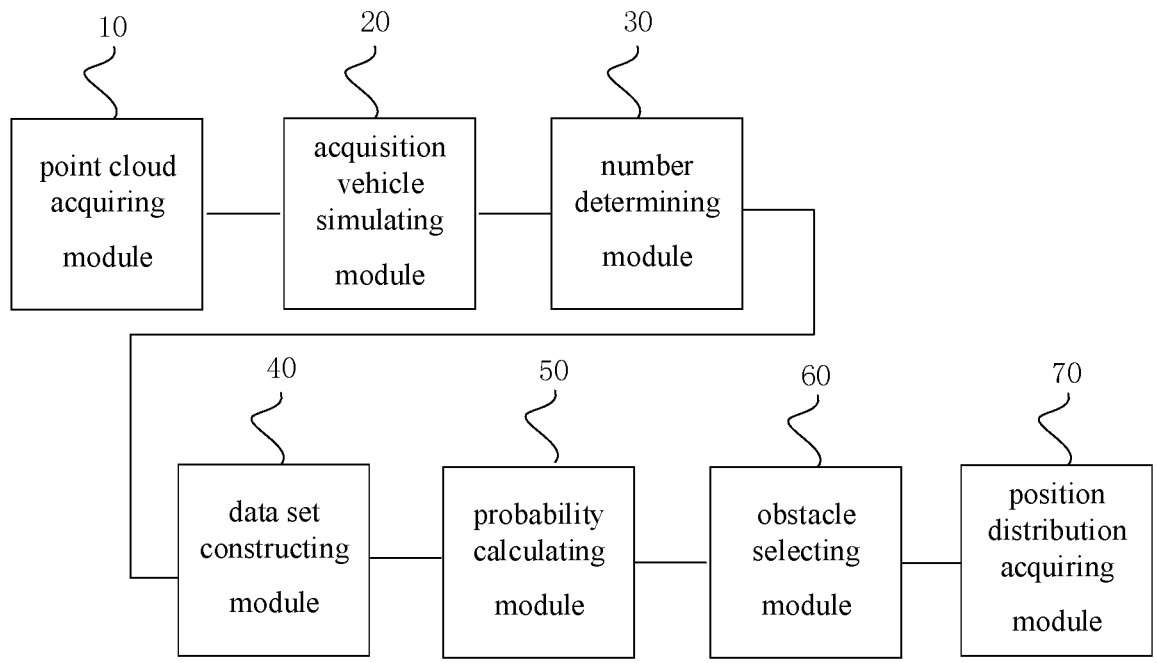
FIG. 4 is a block diagram of an obstacle distribution simulation device based on a probability graph according to an embodiment of the present disclosure.

In another specific embodiment, as shown in FIG. 4, an obstacle distribution simulation device based on a probability graph is provided, which includes:

a point cloud acquiring module 10, configured to acquire a plurality of point clouds of a plurality of frames, wherein each point cloud comprises a plurality of obstacles;

an acquisition vehicle simulating module 20, configured to acquire real labeling data of an acquisition vehicle at vehicle labeled positions, and acquire data of a simulation position of the acquisition vehicle based on the real labeling data and a movement rule of the acquisition vehicle;

a number determining module 30, configured to determine the number of obstacles to be simulated at a position to be simulated based on the data of simulation position of the acquisition vehicle;

a data set constructing module 40, configured to extract real labeling data of the obstacles in the plurality of point clouds, and construct a labeling data set with the extracted real labeling data;

a probability calculating module 50, configured to divide the labeling data set into a plurality of grids and calculate occurrence probabilities of the plurality of obstacles in the plurality of grids;

an obstacle selecting module 60, configured to select the determined number of obstacles to be simulated according to the occurrence probabilities; and a position distribution acquiring module 70, configured to acquire a position distribution of the selected obstacles to be simulated for the position to be simulated based on the real labeling data of the selected obstacles to be simulated.

Figure 5:
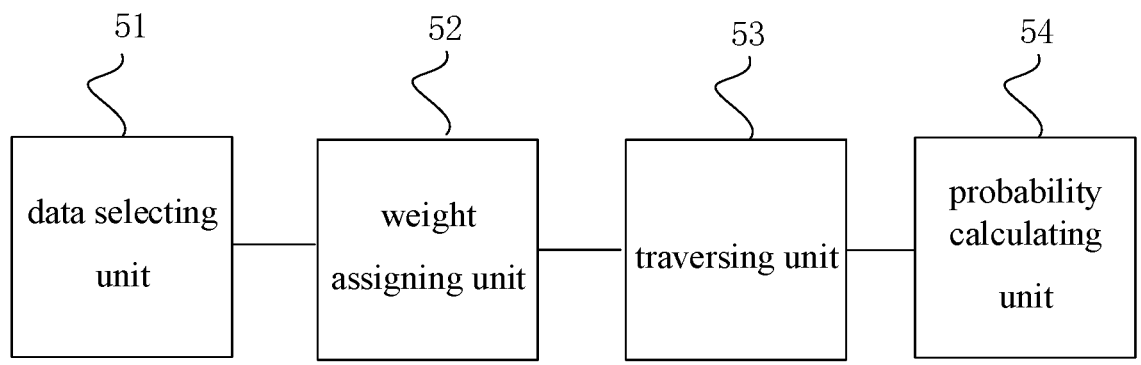
FIG. 5 is a block diagram showing the structure of an obstacle probability calculation module according to an embodiment of the present disclosure.

In an embodiment, as shown in FIG. 5, the probability calculating module 50 includes:

a data selecting unit 51, configured to select one obstacle from the labeling data set, and acquire real labeling data of the one obstacle;

a weight assigning unit 52, configured to match a center of a Gaussian template to a position of the one obstacle in the real labeling data, and assign weights of the Gaussian template to respective grids around the center;

a traversing unit 53, configured to traverse the real labeling data of the plurality of obstacles with the Gaussian template, and accumulate weights of each grid to obtain a total weight of the grid; and a probability calculating unit 54, configured to calculate the occurrence probabilities of the plurality of obstacles in the grids based on the total weights of the grids.

In an embodiment, the number determining module includes:

a data searching unit, configured to search for real labeling data of the acquisition vehicle at the vehicle labeled position identical or adjacent to the position to be simulated; and a number determining unit, configured to retrieve a point cloud acquired at the vehicle labeled position, and determine the number of the obstacles in the retrieved point cloud as the number of obstacles to be simulated.

Third Embodiment

Figure 6:
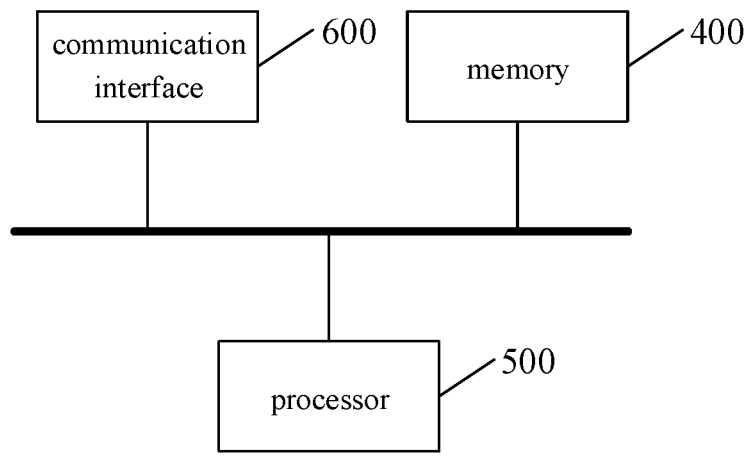
FIG. 6 is a schematic diagram of an obstacle distribution simulation terminal based on a probability graph according to an embodiment of the present disclosure.

As shown in FIG. 6, an obstacle distribution simulation terminal based on a probability graph is provided according to an embodiment of the present disclosure, which includes:

a memory 400 and a processor 500, wherein a computer program that can run on the processor 500 is stored in the memory 400; when the processor 500 executes the computer program, the obstacle distribution simulation method based on probability map according to the above embodiment is implemented; the number the memory 400 and the processor 500 may each be one or more; and a communication interface 600, configured to enable the memory 400 and the processor 500 to communicate with an external device.

The memory 400 may include a high-speed RAM memory, or may also include a non-volatile memory, such as at least one disk memory.

If the memory 400, the processor 500 and the communication interface 600 are implemented independently, the memory 400, the processor 500 and the communication interface 600 may be connected to each other via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus or the like. For ease of illustration, only one bold line is shown in FIG. 6 to represent the bus, but it does not mean that there is only one bus or only one type of bus.

Optionally, in a specific implementation, if the memory 400, the processor 500 and the communication interface 600 are integrated on one chip, then the memory 400, the processor 500 and the communication interface 600 can complete mutual communication through an internal interface.

Fourth Embodiment

An embodiment of the present disclosure provides a computer readable storage medium having a computer program stored thereon which, when executed by a processor, implements the obstacle distribution simulation method based on a probability graph described in any of the above embodiments.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the present disclosure. Moreover, the specific features, structures, materials, or characteristics described may be combined in a suitable manner in any one or more of the embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of some embodiments of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing particular logical functions or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowcharts or otherwise described herein for example may be considered as an ordered list of executable instructions for implementing logical functions. They can be specifically embodied in any computer readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer readable medium" can be any means that can contain, store, communicate, propagate or transmit programs for use by an instruction execution system, apparatus or device or for use in conjunction with the instruction execution system, apparatus or device. More specific examples (non-exhaustive list) of computer readable storage medium at least include: electrical connection parts (electronic devices) having one or more wires, portable computer disk cartridges (magnetic devices), random access memory (RAM), read only memory (ROM), erasable programmable read-only memory (EPROM or flash memory), fiber optic devices, and portable read only memory (CDROM). In addition, the computer-readable storage medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a computer readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a computer readable storage medium if it is implemented in the form of a software function module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. An obstacle distribution simulation method based on a probability graph, comprising:
    acquiring a plurality of point clouds of a plurality of frames, wherein each point cloud comprises a plurality of obstacles;
    acquiring real labeling data of an acquisition vehicle that is configured to obtain the plurality of point clouds by scanning surrounding obstacles, and acquiring data of a simulation position of the acquisition vehicle based on the real labeling data and a movement rule of the acquisition vehicle;
    determining a number of obstacles to be simulated at a position to be simulated based on the data of simulation position of the acquisition vehicle, wherein a point cloud is retrieved based on the data of simulation position of the acquisition vehicle, and a number of the obstacles in the retrieved point cloud is determined as the number of obstacles to be simulated;
    extracting real labeling data of the obstacles in the plurality of point clouds, and constructing a labeling data set with the extracted real labeling data;
    dividing the labeling data set into a plurality of grids and calculating occurrence probabilities of the plurality of obstacles in the plurality of grids;
    selecting the determined number of obstacles to be simulated according to the occurrence probabilities; and
    acquiring a position distribution of the selected number of obstacles to be simulated for the position to be simulated based on the real labeling data of the selected obstacles to be simulated.

2. The obstacle distribution simulation method of claim 1, wherein the calculating occurrence probabilities of the plurality of obstacles in the plurality of grids comprises:
    selecting one obstacle from the labeling data set, and acquiring real labeling data of the one obstacle;
    matching a center of a Gaussian template to a position of the one obstacle in the real labeling data, and assigning weights of the Gaussian template to respective grids around the center;
    traversing the real labeling data of the plurality of obstacles with the Gaussian template, and accumulating weights of each grid to obtain a total weight of the grid; and
    calculating the occurrence probabilities of the plurality of obstacles in the grids based on the total weights of the grids.

3. The obstacle distribution simulation method of claim 1, wherein the selecting the determined number of obstacles to be simulated according to the occurrence probabilities comprises:
    selecting the determined number of obstacles to be simulated with an unequal probability sampling method according to the occurrence probabilities.

4. The obstacle distribution simulation method of claim 1, wherein the determining the number of obstacles to be simulated at a position to be simulated based on the data of simulation position of the acquisition vehicle comprises:
    searching for real labeling data of the acquisition vehicle at a vehicle labeled position identical or adjacent to the position to be simulated; and retrieving a point cloud acquired at the vehicle labeled position, and determining the number of the obstacles in the retrieved point cloud as the number of obstacles to be simulated.

5. A non-transitory computer readable storage medium having computer programs stored thereon that, when executed by a processor, cause the processor to perform the method of claim 1.

6. The obstacle distribution simulation method of claim 1, wherein the method further comprises scanning, by the acquisition vehicle, the surrounding objects with a radar.

7. The obstacle distribution simulation method of claim 1, wherein the movement rule comprises moving along a main road or moving along a side road.

8. The obstacle distribution simulation method of claim 1, wherein the acquisition vehicle is different than the obstacles.

9. An obstacle distribution simulation device based on a probability graph, comprising:
  one or more processors; and
  a storage device configured for storing one or more programs, wherein
  the one or more programs, when executed by the one or more processors, cause the one or more processors to:
    acquire a plurality of point clouds of a plurality of frames, wherein each point cloud comprises a plurality of obstacles;
    acquire real labeling data of an acquisition vehicle that is configured to obtain the plurality of point clouds by scanning surrounding obstacle, and acquire data of a simulation position of the acquisition vehicle based on the real labeling data and a movement rule of the acquisition vehicle;
    determine a number of obstacles to be simulated at a position to be simulated based on the data of simulation position of the acquisition vehicle, wherein a point cloud is retrieved based on the data of simulation position of the acquisition vehicle, and a number of the obstacles in the retrieved point cloud is determined as the number of obstacles to be simulated;
    extract real labeling data of the obstacles in the plurality of point clouds, and construct a labeling data set with the extracted real labeling data;
    divide the labeling data set into a plurality of grids and calculate occurrence probabilities of the plurality of obstacles in the plurality of grids;
    select the determined number of obstacles to be simulated according to the occurrence probabilities; and
    acquire a position distribution of the selected number of obstacles to be simulated for the position to be simulated based on the real labeling data of the selected obstacles to be simulated.

10. The obstacle distribution simulation device of claim 9, wherein the one or more programs are executed by the one or more processors to enable the one or more processors to:
  select one obstacle from the labeling data set, and acquire real labeling data of the one obstacle;
  match a center of a Gaussian template to a position of the one obstacle in the real labeling data, and assign weights of the Gaussian template to respective grids around the center;
  traverse the real labeling data of the plurality of obstacles with the Gaussian template, and accumulate weights of each grid to obtain a total weight of the grid; and
  calculate the occurrence probabilities of the plurality of obstacles in the grids based on the total weights of the grids.

11. The obstacle distribution simulation device of claim 9, wherein the one or more programs are executed by the one or more processors to enable the one or more processors to:
  search for real labeling data of the acquisition vehicle at a vehicle labeled position identical or adjacent to the position to be simulated; and
  retrieve a point cloud acquired at the vehicle labeled position, and determine the number of the obstacles in the retrieved point cloud as the number of obstacles to be simulated.

* * * * *